United States Patent [19]

Levine et al.

[11] 4,118,786

[45] Oct. 3, 1978

[54] INTEGRATED BINARY-BCD LOOK-AHEAD ADDER

[75] Inventors: Samuel R. Levine, Poughkeepsie; Shanker Singh, Fishkill; Arnold Weinberger, Poughkeepsie, all of N.Y.

[73] Assignee: International Business Machines Corporation, Armonk, N.Y.

[21] Appl. No.: 758,378

[22] Filed: Jan. 10, 1977

[51] Int. Cl.² ............................................. G06F 7/50
[52] U.S. Cl. .................................. 364/783; 364/787
[58] Field of Search ................ 235/174, 175; 364/783, 364/787

[56] References Cited

U.S. PATENT DOCUMENTS

| 3,596,074 | 7/1971 | Mitrofanoff | 235/174 |
| 3,629,565 | 12/1971 | Schmookler et al. | 235/174 |
| 3,711,693 | 1/1973 | Dahl | 235/174 |
| 3,752,394 | 8/1973 | Igel | 235/174 |
| 3,958,112 | 5/1976 | Miller | 235/174 |

*Primary Examiner*—David H. Malzahn
*Attorney, Agent, or Firm*—Edward S. Gershuny

[57] ABSTRACT

An improved system for adding two numbers together. The numbers may be expressed either in binary form or in binary coded decimal form (wherein each decimal digit is represented by its equivalent four binary bits). By taking advantage of "don't care" decimal input conditions, a minimal implementation of a carry look-ahead adder which can operate upon both types of numbers is obtained.

4 Claims, 9 Drawing Figures

FIG. 1
| 0-3 | 4-7 | 8-11 | 12-15 | 16-19 | 20-23 | 24-27 | 28-31 | 32-35 | 36-39 | 40-43 | 44-47 | 48-51 | 52-55 | 56-59 | 60-63 | 64-67 |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 |
← I → ← II → ← III → ← IV →
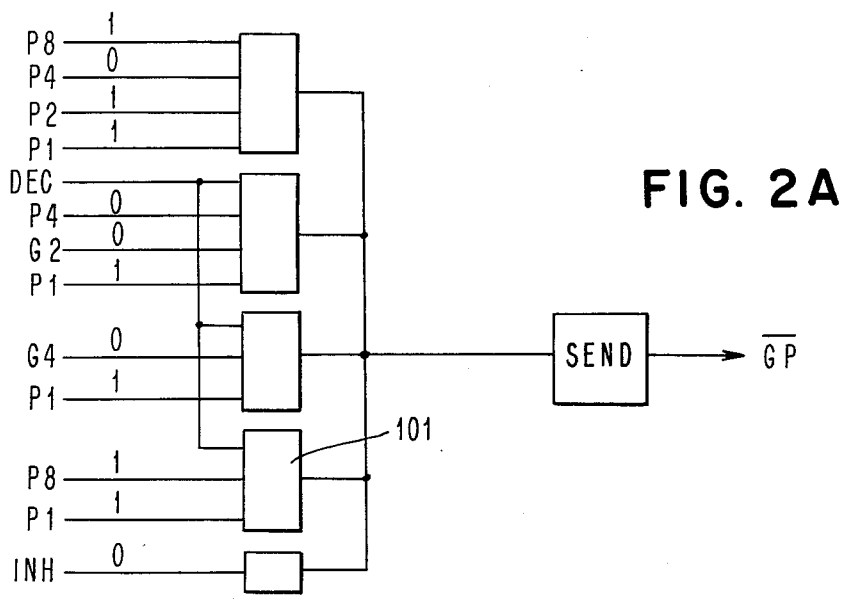
FIG. 2A
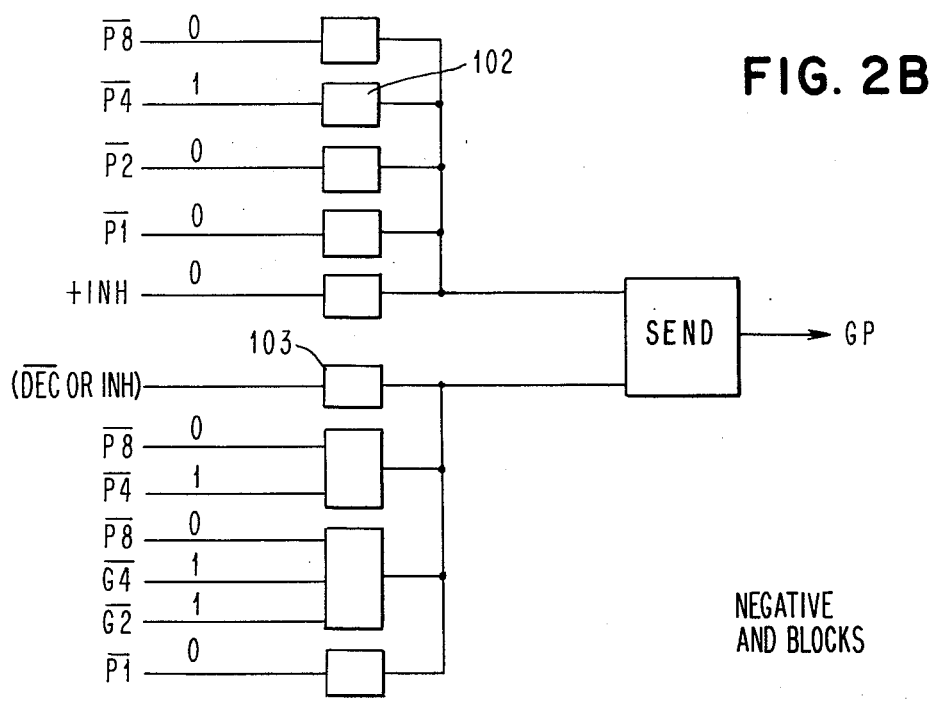
FIG. 2B
NEGATIVE AND BLOCKS

NEGATIVE AND BLOCKS

FIG. 4A

| (A8,B8) | (A4,B4) | $\overline{C1}$ (0) | | | | | | C1 (2) | | | | | |
|---|---|---|---|---|---|---|---|---|---|---|---|---|---|
| | | $\overline{DEC}$ (=HEX) | | | DEC | | | $\overline{DEC}$ (=HEX) | | | DEC | | |
| | | $\overline{P2}$(0) | H2(2) | G2(4) | $\overline{P2}$(0) | H2(2) | G2(4) | $\overline{P2}$(0) | H2(2) | G2(4) | $\overline{P2}$(0) | H2(2) | G2(4) |
| $\overline{P8}$(0) | $\overline{P4}$(0) | 0 | 2 | 4 | 0 | 2 | 4 | 2 | 4 | 6 | 2 | 4 | 6 |
| | H4(4) | 4 | 6 | 8 | 4 | 6 | 8 | 6 | 8 | 10 | 6 | 8 | 0 |
| | G4(8) | 8 | 10 | 12 | 8 | 0 | 2 | 10 | 12 | 14 | 0 | 2 | 4 |
| H8(8) | $\overline{P4}$(0) | 8 | 10 | 12 | 8 | 0 | × | 10 | 12 | 14 | 0 | 2 | × |
| | H4(4) | 12 | 14 | 0 | 2 | 4 | × | 14 | 0 | 2 | 4 | 6 | × |
| | G4(8) | 0 | 2 | 4 | × | × | × | 2 | 4 | 6 | × | × | × |
| G8(16) | $\overline{P4}$(0) | 0 | 2 | 4 | 6 | × | × | 2 | 4 | 6 | 8 | × | × |
| | H4(4) | 4 | 6 | 8 | × | × | × | 6 | 8 | 10 | × | × | × |
| | G4(8) | 8 | 10 | 12 | × | × | × | 10 | 12 | 14 | × | × | × |

FIG. 4B

| (A8,B8) | (A4,B4) | $\overline{C1}$ (0) | | | | | | C1 (2) | | | | | |
|---|---|---|---|---|---|---|---|---|---|---|---|---|---|
| | | $\overline{DEC}$ (=HEX) | | | DEC | | | $\overline{DEC}$ (=HEX) | | | DEC | | |
| | | $\overline{P2}$(0) | H2(2) | G2(4) | $\overline{P2}$(0) | H2(2) | G2(4) | $\overline{P2}$(0) | H2(2) | G2(4) | $\overline{P2}$(0) | H2(2) | G2(4) |
| $\overline{P8}$ | $\overline{P4}$ | | 2 | | | 2 | | 2 | 2 | | 2 | 2 | |
| | H4 | | 2 | | | 2 | | 2 | 2 | | 2 | 2 | |
| | G4 | | 2 | | | | 2 | 2 | 2 | | 2 | | |
| H8 | $\overline{P4}$ | | 2 | | | | × | 2 | 2 | | 2 | 2 | × |
| | H4 | | 2 | | 2 | | × | 2 | 2 | | 2 | 2 | × |
| | G4 | | 2 | | × | × | × | 2 | 2 | | × | × | × |
| G8 | $\overline{P4}$ | | 2 | | 2 | × | × | 2 | 2 | | × | × | × |
| | H4 | | 2 | | × | × | × | 2 | 2 | | × | × | × |
| | G4 | | 2 | | × | × | × | 2 | 2 | | × | × | × |
| $\overline{P8}$ | $\overline{P4}$ | | | 4 | | | 4 | 4 | | 4 | 4 | | 4 |
| | H4 | 4 | | 4 | 4 | | 4 | 4 | | 4 | 4 | | |
| | G4 | | | 4 | | | | 4 | | 4 | 4 | | 4 |
| H8 | $\overline{P4}$ | | | 4 | | | × | 4 | | 4 | | | × |
| | H4 | 4 | | 4 | | 4 | × | 4 | | | 4 | 4 | × |
| | G4 | | | 4 | × | × | × | 4 | | 4 | × | × | × |
| G8 | $\overline{P4}$ | | | 4 | 4 | × | × | 4 | | 4 | × | × | × |
| | H4 | 4 | | 4 | × | × | × | 4 | | | × | × | × |
| | G4 | | | 4 | × | × | × | 4 | | 4 | × | × | × |
| $\overline{P8}$ | $\overline{P4}$ | | | | | | | | | | | | |
| | H4 | | | | 8 | | 8 | 8 | 8 | | 8 | | |
| | G4 | 8 | 8 | 8 | 8 | | | 8 | 8 | 8 | | | |
| H8 | $\overline{P4}$ | 8 | 8 | 8 | 8 | | × | 8 | 8 | 8 | | | × |
| | H4 | 8 | | | 8 | | × | 8 | | | | | × |
| | G4 | | | | × | × | × | | | | × | × | × |
| G8 | $\overline{P4}$ | | | | × | × | × | | | | 8 | | × |
| | H4 | | | 8 | × | × | × | | 8 | 8 | × | × | × |
| | G4 | 8 | 8 | 8 | × | × | × | 8 | 8 | 8 | × | × | × |

NEGATIVE AND BLOCKS

INTEGRATED BINARY-BCD LOOK-AHEAD ADDER

BACKGROUND OF THE INVENTION

This invention relates to adders for use in electronic data processing systems. More particularly, it relates to an improved adder which can handle both binary and binary-coded-decimal numbers.

DESCRIPTION OF THE PRIOR ART

Early in the development of binary adders, it was recognized that one limitation on the speed of such adders was the time that it took for carries to "ripple" from low-order bits (or groups of bits) to high-order bits (or groups of bits). This recognition led to the development of "carry look-ahead adders" which contained circuitry for recognizing that carries would be developed during the addition process, and for providing relatively early handling of the carries. Subsequently, look-ahead techniques were developed for adders which operate upon binary-coded-decimal (BCD) numbers. (See, for example, U.S. Pat. No. 3,629,565, by M. S. Schmookler and A. Weinberger for Decimal Adder for Directly Implementing BCD Addition Utilizing Logic Circuitry. The descriptions contained in that patent are incorporated herein by this reference.)

Although a large number of adders are known which are described as being capable of handling either binary or BCD numbers, such adders typically fall into one of two classes. They are either binary adders which accomplish BCD arithmetic by actually performing binary arithmetic and then applying a correction factor, or they comprise separate sets of arithmetic logic (one set dedicated to binary arithmetic and one set dedicated to BCD arithmetic) and actually utilize little more than the input and output registers for both forms of arithmetic. Each of these types of prior art adders suffers from a particular form of inefficiency: the former is time-inefficient because its use of a BCD correction results in relatively slow performance of BCD arithmetic; the latter is cost-inefficient because generally so little circuitry is shared by the binary and the BCD sections of the adder that it is almost as costly as having two separate adders for performing the two types of arithmetic.

SUMMARY OF THE INVENTION

The above and other disadvantages of the prior art are overcome in accordance with a preferred embodiment of the invention by providing an improved adder for performing both binary and BCD arithmetic. Because a very high percentage of the adder circuitry is utilized for performing both types of arithmetic, the complexity of this adder is only slightly greater than that of a prior art binary adder or that of a prior art BCD adder. The relatively simple implementation is obtained primarily through the use of "don't care" conditions with respect to BCD arithmetic. Each of the BCD "don't cares" is directly utilized in generation of binary sums. In order to obtain maximum performance, the preferred implementation of this adder utilizes carry look-ahead circuitry for both binary and BCD arithmetic.

The foregoing and other features of the present invention may be more fully understood and appreciated by considering the following detailed description and drawings.

BRIEF DESCRIPTION OF THE DRAWINGS

FIG. 1 illustrates a preferred adder input format and will be referred to for help in defining terms used in this specification;

FIGS. 2A and 2B show circuitry for generating the digit carry propagate function;

FIGS. 4A and 4B are a pair of truth tables which define various aspects of a preferred implementation of the invention.

DETAILED DESCRIPTION

Figure 3A:
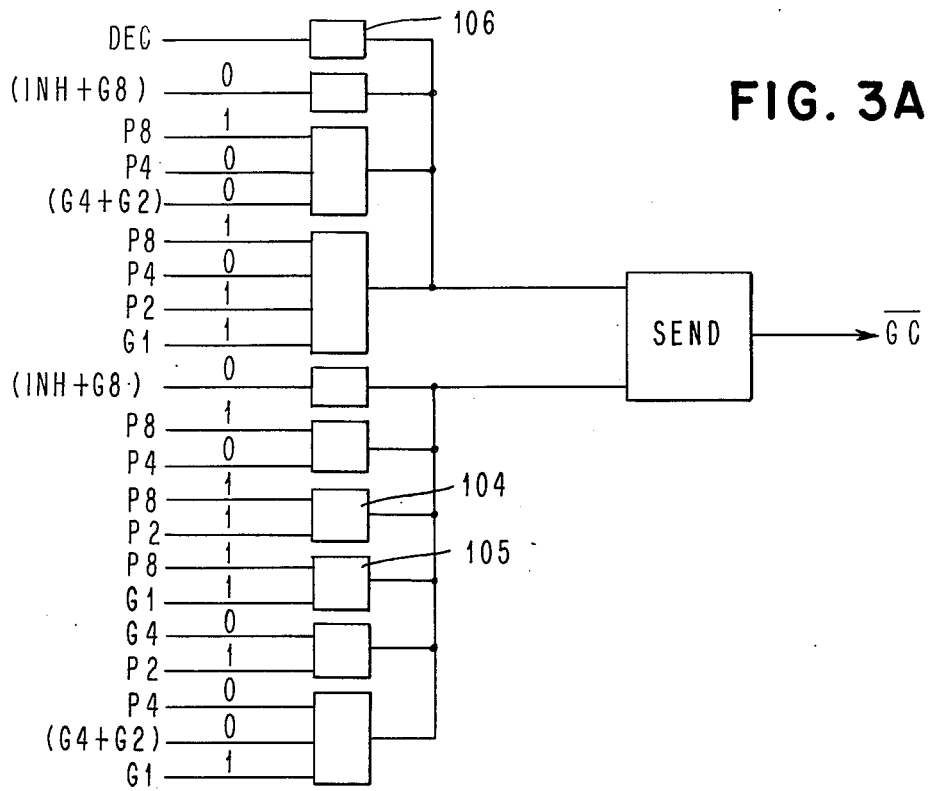
FIGS. 3A and 3B show circuitry for generating the digit carry generate function.

The presentation below includes a general description of the mathematical theory upon which this invention is based. This will enable those skilled in the art to perceive the generalized aspects of the invention and to achieve specific implementations that differ in various forms and details from the preferred embodiment. Also described below are those hardware aspects of a preferred embodiment which differ from adders heretofore known. For the most part, little or no description will be provided herein of those aspects of the invention that are substantially identical to implementations known in the prior art. For those skilled in the art, such additional descriptions would be totally unnecessary for the attainment of a complete understanding of how to make and use the invention, and might tend to make it more difficult to determine the precise points of novelty described herein.

A typical adder in an electronic data processing system will combine an n-bit addend with an n-bit augend to produce an n-bit sum. In the preferred embodiment of this invention (as is common in the prior art) the addend, augend and sum are regarded as being divided into a plurality of four-bit "digits". (Throughout this specification, the word "digit" is used generically to represent an integer greater than or equal to zero, and less than the number representing the base in which arithmetic is being performed.) When utilizing BCD arithmetic, each of the digits could have any of the values 0, 1, 2, 3, 4, 5, 6, 7, 8 or 9. When performing binary arithmetic, each of the digits could have one of the hexadecimal values 0, 1, 2, 3, 4, 5, 6, 7, 8, 9, A, B, C, D, E or F; A, B, C, D, E and F being equivalent to the decimal numbers 10, 11, 12, 13, 14 and 15, respectively.

When adding two numbers together, it is common practice in high speed adders to provide circuitry for processing each digit as an entity. Corresponding addend and augend digits are added (along with a carry from the next low-order digit position, if there was one) to generate a corresponding sum digit. In a look-ahead adder, the carries are generated early in the add operation so that they may be included in the generation of sum digits without the necessity of subsequent cycles for carries to ripple from digit to digit.

As shown in FIG. 1, a preferred implementation of this invention utilizes addends, augends and sums containing 68 bits (0–67) divided into 17 digits (1–17) which are further divided into four groups (I–IV). Each digit contains four bits. Each of groups II through IV contains four digits. Group I is shown to contain five digits. The first digit contains an indication of the sign. In one implementation, digits one through five could be treated numerically the same as the other digits. In other implementations (for example, floating point apparatus) digits one and two could contain sign and exponent information, or digits one through three could contain sign, exponent and arithmetic overflow information. The first digit of the sum will indicate the sign of the result. The carry look-ahead allows end around carry from the appropriate digit in complement arithmetic. Whether or not the digits are divided into a number of larger groups (and the number of digits in each group) is primarily dependent upon the manner in which carry look-ahead is implemented in the adder.

Consider a typical digit within the format shown in FIG. 1. For example, digit position 10 is represented by bits 36, 37, 38 and 39. When adding two numbers A and B, let A36, A37, A38, A39 and B36, B37, B38, B39 be the four bits which comprise the tenth digit in each number. Within the digits, bits A36 and B36 are of weight 8, bits A37 and B37 are of weight 4, bits A38 and B38 are of weight 2 and bits A39 and B39 are of weight 1. Thus, the final sum of this typical digit position is obtained by the following addition:

```
A(8) A(4) A(2) A(1)
B(8) B(4) B(2) B(1)
              Cin
―――――――――――――――――
S(8) S(4) S(2) S(1)
``` where S(8), S(4), S(2) and S(1) represent the final weighted hexadecimal or decimal sum bits for any digit position and Cin is the carry (preferably derived from a common look-ahead network).

Although the only carry referred to above is a carry from digit to digit, the adder must also take into consideration carries from bit to bit. When operating in any given number base B, a carry will be generated when the sum of two corresponding digits is equal to or greater than B. In the binary system, a sum of 2 will cause carry generation; in decimal, a sum of 10 or more will cause carry generation; and in the hexadecimal system, a sum of 16 or more will cause carry generation.

Another aspect of carry processing is referred to as carry propagate. This refers to the situation in which a carry into a bit (or digit) position will result in a carry out of that position. In any given number system B, a strictly-defined carry propagate occurs when the digits (or bits) in that position add up exactly to one less than B. In binary, the strictly-defined carry propagate occurs when the sum in a given bit position is 1; in decimal, the strictly-defined carry propagate occurs when the sum of two digits is 9; and in hexadecimal, the strictly-defined carry propagate occurs when the sum of two digits is F (equal to decimal 15). A more common definition of carry propagate is a simple function that includes carry generate as a "don't care" condition. In binary, the commonly-defined carry propagate occurs when a sum in a given bit position is one or greater; in decimal, when the sum of the two digits is 9 or a limited number of combinations greater than 9; and in hexadecimal, when the sum is F or a limited number of combinations greater than F. With respect to binary addition in particular, another significant function is the "half-sum" which is simply the strictly-defined carry propagate.

In the preferred embodiment of this invention, each digit contains four bits. For each bit, there are two adder inputs A and B. The bits have weights 1, 2, 4 and 8, from low-order to high-order within the digit. For each bit, the three functions carry propagate (P$i$), carry generate (G$i$) and half sum (H$i$) can be defined in terms of the inputs A$i$ and B$i$ or in terms of the other two functions as shown in equations (1) below.

$$Pi = Ai + Bi = \overline{Gi + Hi} \quad (1a)$$

$$Gi = Ai \cdot Bi = Pi \cdot \overline{Hi} \quad (1b)$$

$$Hi = Ai \dotplus Bi = Pi \cdot \overline{Gi} \quad (1c)$$

$$\overline{Pi} = \overline{Ai} \cdot \overline{Bi} = \overline{Gi} \cdot \overline{Hi} \quad (1d)$$

$$\overline{Gi} = \overline{Ai} + \overline{Bi} = \overline{Pi} + Hi \quad (1e)$$

$$\overline{Hi} = \overline{Ai \dotplus Bi} = \overline{Pi} + Gi \quad (1f)$$

For each digit, there are "digit carry propagate" (GP) and "digit carry generate" (GC) functions that can be defined in terms of the bit carry propagate (P$i$) and bit carry generate (G$i$), where $i$ equals the bit weightings 1, 2, 4 and 8. GP, GC and their complement functions are defined in equations (2).

$$GP = P8 \cdot P4 \cdot P2 \cdot P1 + \overline{DEC} \cdot [P4 \cdot G2 \cdot P1 + G4 \cdot P1 + P8 \cdot P1] \quad (2a)$$

$$\overline{GP} = [\overline{P8} + \overline{P4} + \overline{P2} + \overline{P1}] \cdot [\overline{DEC} + \overline{P8} \cdot \overline{P4} + \overline{P8} \cdot \overline{G4} \cdot \overline{G2} + \overline{P1}] \quad (2b)$$

$$GC = [DEC + G8 + P8 \cdot P4 \cdot (G4 + G2) + P8 \cdot P4 \cdot P2 \cdot G1] \cdot [G8 + P8 \cdot P4 + P8 \cdot P2 + P8 \cdot G1 + G4 \cdot P2 + P4 \cdot (G4 + G2) \cdot G1] \quad (2c)$$

$$\overline{GC} = [\overline{P8} + \overline{G8} \cdot \overline{P4} + \overline{G8} \cdot \overline{G4} \cdot \overline{P2} + \overline{G8} \cdot \overline{G4} \cdot \overline{G2} \cdot \overline{G1}] \cdot [\overline{DEC} + \overline{P8} \cdot \overline{P4} + \overline{P8} \cdot \overline{G4} \cdot \overline{G2} + \overline{P8} \cdot \overline{G4} \cdot \overline{G1} + \overline{P8} \cdot \overline{P2} \cdot \overline{G1} + \overline{G8} \cdot \overline{P4} \cdot \overline{P2} \cdot \overline{G1}] \quad (2d)$$

Equations (2) represent the carry propagate and carry generate functions for a digit in a system that handles both hexadecimal and BCD arithmetic. In these equations, and in the remainder of this specification, DEC represents BCD (that is, decimal) arithmetic.

Figure 3B:
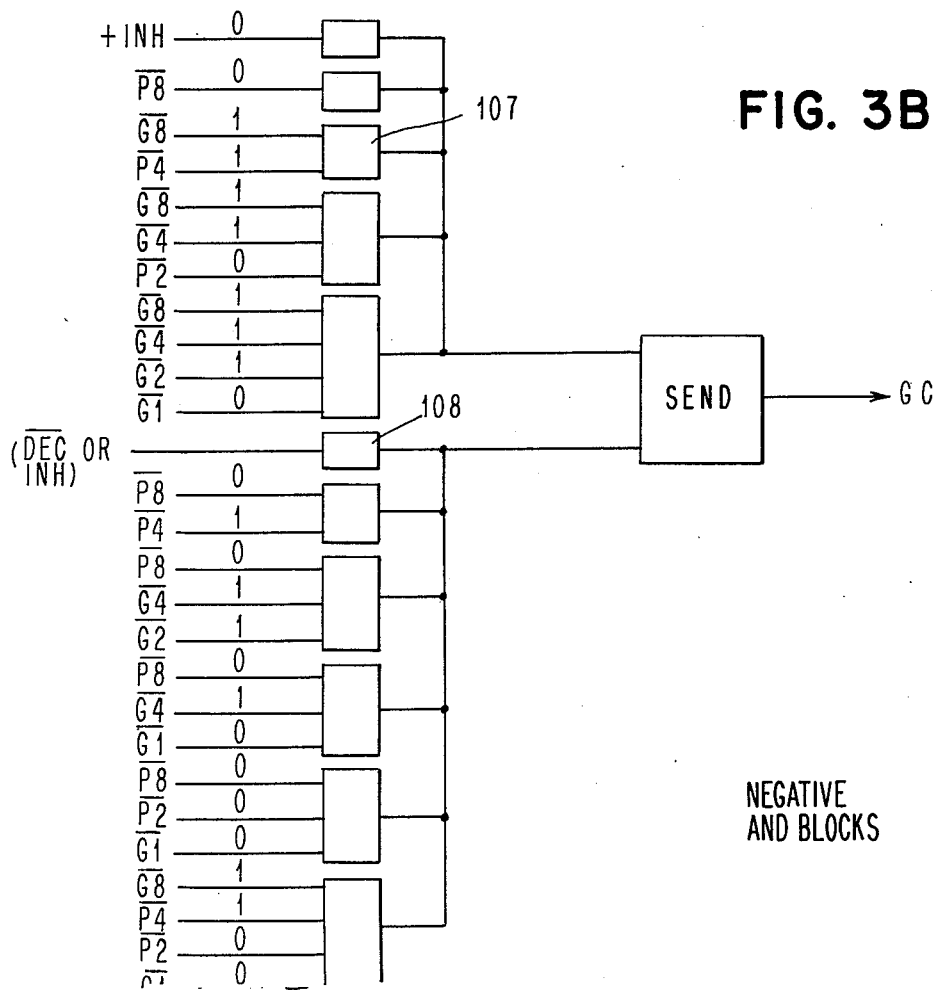

The combined hexadecimal and decimal carry look-ahead circuitry defined by equations (2) is directly implementable in a variety of technologies. The preferred implementation of this invention utilizes so-called negative logic in which positive outputs are obtained by implementing the complement of a given function. Keeping in mind that negative logic is being used, FIG. 2A shows an implementation of equation (2a). Because negative logic is being used, the circuit of FIG. 2A produces an output that is the complement of the output defined by equation (2a). In this figure, each multi-input logic block is a negative AND block, the SEND block is a driver for sending signals off-chip and the input signal INH is an inhibit signal which may be used to deactivate the logic output for testing purposes. Similarly, FIG. 2B shows an implementation of equation (2b). The SEND driver functions as a negative AND circuit when it is provided with multiple inputs. FIGS. 3A and 3B illustrate negative logic implementations of equations (2c) and (2d), respectively. In the implementations of the digit carry propagate (GP) and digit carry generate (GC) shown in FIGS. 2. (A and B) and 3 (A and B), respectively, no means are explicitly shown for generating the inputs P$i$ and G$i$ from the bit inputs A$i$ and B$i$. Those means are completely defined by equations (1a) through (1f) and need not be further described herein.

Sum Generation

The generalized processing of carries for both hexadecimal and decimal, as described above, comprises little more than an ORing of the separate decimal and hexadecimal carry functions. Although a similar technique could be utilized for sum generation, this would require almost as much circuitry as two separate adders. In accordance with this invention, a far superior implementation of the hexadecimal and decimal sums is described below.

For both decimal and hexadecimal arithmetic, the least significant sum bit (that is, the unit bit S1) is generated as defined by equation (3).

$$\overline{S1} = \overline{H1 \mathbin{\forall} Cin} = H1 \cdot Cin + \overline{H1} \cdot \overline{Cin} \quad (3)$$

There are differences in the generation of the three high-order sum bits for decimal and hexadecimal digits. However, this invention utilizes commonality in their expressions to yield a particularly efficient combinatorial network having inputs which comprise the single bit functions of equations (1) and the common input carry, Cin. In accordance with this invention, the commonality is further enhanced by recognition of certain "don't care" conditions that are present in decimal; that is, a decimal digit cannot take on values of 10 or greater, so inputs which would represent those values can be treated as "don't care" conditions when the apparatus is used for decimal arithmetic. With respect to decimal arithmetic, the "don't care" conditions are summarized in equations (4a) and (4b).

$$A8 \ (A4 + A2) = B8 \cdot (B4 + B2) = \text{don't care} \quad (4a)$$

$$G8 \ (P4 + P2) = H8 \cdot (G4 + G2) = \text{don't care} \quad (4b)$$

Equation (4a) defines the conditions in which one (or both) of the inputs contains a bit of weight 8 along with a bit of weight 4 or weight 2. Either of these bit combinations would define a single decimal digit having a value equal to or greater than 10, a condition which cannot exist in decimal notation. Equation (4b) merely states the same set of "don't care" conditions in another manner. The first term of equation (4b) requires (in order for G8 to be true) that both inputs contain a bit of weight 8 and that one of the inputs contains a bit of weight 4 (in order for P4 to be true) or a bit of weight 2 (in order for P2 to be true). The second term of equation (4b) requires that one of the inputs contain a bit of weight 8 (in order for H8 to be true) and that both of them contain a bit of weight 4 (in order for G4 to be true) or both of them contain a bit of weight 2 (for G2 to be true).

In generating the three high-order sum bits, the implementation incorporates the following two hypotheses.

(a) The three high-order sum bits can be expressed in terms of the single bit functions of the bits of weights 2, 4 and 8, and of the carry, C1, from the bit of weight 1.

(b) Each of the three high-order sum bits, Si, can be expressed as the OR of two terms, one term consisting of C1 ANDed with a coefficient Xi and the other term consisting of the complement of C1 ANDed with a coefficient Yi.

These two criteria are restated in equations (5a) through (5c).

$$\overline{S2} = X2 \cdot C1 + Y2 \cdot \overline{C1} \quad (5a)$$

$$\overline{S4} = X4 \cdot C1 + Y4 \cdot \overline{C1} \quad (5b)$$

$$\overline{S8} = X8 \cdot C1 + Y8 \cdot \overline{C1} \quad (5c)$$

A set of coefficients $Xi$ and $Yi$ can be determined by means of a table such as that shown in FIGS. 4A and 4B. The upper portion of the table, as shown in FIG. 4A, is simply a truth table, for both decimal and hexadecimal, which tells the digit that should result from a particular set of input conditions. The nine rows of the table (divided into three groups of three rows) define the nine arithmetically distinct combinations of bits A8, B8, A4 and B4. The table also contains twelve columns. The first six columns pertain to the situation in which there is no carry out from bit position 1, and the second six columns pertain to the situation in which there is a carry out from bit position 1. Each of the two groups of six columns is further divided into three columns relating to hexadecimal arithmetic and three columns decimal arithmetic. Each of the latter groups of three columns is further divided to represent the three arithmetically distinct combinations of A2 and B2.

Note that for each pair of bit inputs $Ai$ and $Bi$ there are three (not four) arithmetically distinct combinations:

(a) $Ai = Bi = 0$. See equation (1d).

(b) $Ai \neq Bi$. See equation (1c).

(c) $Ai = Bi = 1$. See equation (1b)

Each box in the table contains a number representing the digit value that would result from the defined input conditions. In the decimal portions of the table, an X represents a "don't care" condition resulting from the fact that the inputs defined for that box cannot occur in decimal notation.

As an example of the use of the table shown in FIG. 4A, consider the situation in which the two numbers being added contain a single bit of weight 8, a single bit of weight 4, a single bit of weight 2, and there is no carry from the low-order bit. The conditions defined by this example, as may be seen from equations (1), are H8, H4, H2, and $\overline{C1}$, respectively. Condition H8 defines the second group of three rows in the table (and contributes a value 8 to the result); condition H4 defines the second row in that section of the table (and contributes a value 4 to the result); condition $\overline{C1}$ defines the first six columns of the table (and contributes 0 to the result); and condition H2 defines the second or fifth column (depending upon whether hexadecimal or decimal arithmetic is being performed) within this section. If hexadecimal arithmetic is being used in this example, H2 will contribute 2 to the result, and the final result digit will be found at the intersection of the fifth row and second column. The individual contributions of H8 (8), H4 (4), H2 (2), and $\overline{C1}$ (0) add up to the value 14 (hexadecimal digit E) as shown in the table. If the example were utilizing decimal arithmetic, the result (with the same elemental contributions) would be shown at the intersection of the fifth row and fifth column to be the decimal digit 4. Of course, in this case, a carry would have been generated.

As was discussed above, with respect to equations (4a) and (4b), there are several "don't care" conditions with respect to decimal arithmetic. The 26 "don't care" decimal conditions are each represented by a box with an X in it in the table.

FIG. 4B contains three tables which are an expansion of the table shown in FIG. 4A. Each of the tables shown in FIG. 4B is arranged in a manner that is identical to the arrangement shown in FIG. 4A. They indicate the respective values of sum bits S2, S4 and S8. The first table shown in FIG. 4B contains a "2" in each box for which the input conditions would require $S2 = 1$. Each empty box relates to a set of input conditions for which $S2 = 0$. Each box that contains an X relates to a set of "don't care" input conditions for decimal arithmetic. Similarly, the second table in FIG. 4B contains a "4" in each box for which the input conditions would require $S4 = 1$, and the third table in FIG. 4B contains an "8" in each box for which the input conditions would require $S8 = 1$.

The tables shown in FIG. 4B can be used to determine values for the coefficients $Xi$ and $Yi$ defined in equations (5a) through (5c). The first six columns of the three tables define Y2, Y4 and Y8, respectively; the second group of six columns in the three tables define X2, X4 and X8, respectively. An inspection of the tables in FIG. 4B will show that the coefficients $Xi$ and $Yi$ can be stated as follows.

$$\overline{Y2} = H2 \cdot \overline{DEC} + \overline{P8} \cdot \overline{G4} \cdot H2 + G4 \cdot G2 \cdot DEC + H8 \cdot H4 \cdot \overline{H2} \cdot DEC + G8 \cdot DEC \quad (6a)$$

$$\overline{X2} = \overline{H2} \cdot \overline{DEC} + \overline{P8} \cdot \overline{P4} \cdot \overline{H2} + \overline{P8} \cdot \overline{G4} \cdot \overline{P2} + G4 \cdot H2 \cdot DEC + H8 \cdot H2 \cdot DEC \quad (6b)$$

$$\overline{Y4} = \overline{P4} \cdot G2 + \overline{P8} \cdot H4 \cdot \overline{G2} + H4 \cdot \overline{G2} \cdot \overline{DEC} + G4 \cdot G2 \cdot \overline{DEC} + H4 \cdot H2 + G8 \cdot DEC \quad (6c)$$

$$\overline{X4} = \overline{P8} \cdot \overline{P4} \cdot H2 + \overline{H4} \cdot H2 \cdot \overline{DEC} + H4 \cdot \overline{P2} + \overline{H4} \cdot G2 + H8 \cdot H4 \cdot DEC \quad (6d)$$

$$\overline{Y8} = \overline{H8} \cdot H4 \cdot G2 + H8 \cdot \overline{P4} \cdot \overline{P2} + \overline{H8} \cdot G4 \cdot \overline{DEC} + H8 \cdot \overline{P4} \cdot \overline{DEC} + H8 \cdot \overline{G4} \cdot \overline{G2} \cdot \overline{DEC} + G4 \cdot \overline{P2} \cdot DEC \quad (6e)$$

$$\overline{X8} = \overline{H8} \cdot H4 \cdot H2 + \overline{H8} \cdot H4 \cdot G2 \cdot \overline{DEC} + \overline{H8} \cdot G4 \cdot \overline{DEC} + H8 \cdot \overline{P4} \cdot \overline{DEC} + H8 \cdot \overline{G4} \cdot \overline{P2} \cdot \overline{DEC} + G8 \cdot DEC \quad (6f)$$

Note that since equations (5a) through (5c) relate to the complement sum bits, equations (6a) through (6f) are written to define the complements of $Xi$ and $Yi$. These equations have been written so as to cover the truth tables with a minimum number of terms and a limited number of single-bit functions. Thus, P2, P4, P8 and $\overline{G8}$ were not used. In the hardware implementation to be described below, $\overline{P4}$ will be replaced with the term $(\overline{G4} \cdot \overline{H4})$.

Equations (5) can be expressed as functions of $Cin$ by noting that $$C1 = G1 + P1 \cdot Cin$$

$$\overline{C1} = \overline{P1} + \overline{G1} \cdot \overline{Cin}$$

Further, $Cin$ may itself be expressed as a function of a final digit carry, $C$, that occurs one or more digits preceding (that is, lower-order) the digit whose sum is being generated. To do this, it is helpful to define two additional functions: "local carry generate" (LG) for the group of digits lying between the digit from which C was generated or propagated, and the digit whose sum is being generated. It is also helpful to refer to a local carry propagate (LP) for this same group of digits. Thus, $$C1 = G1 + P1 \cdot LG + P1 \cdot LP \cdot C \quad (7a)$$

$$\overline{C1} = \overline{P1} + \overline{G1} \cdot \overline{LG} \cdot \overline{LP} + \overline{G1} \cdot \overline{LG} \cdot \overline{C} \quad (7b)$$

Equations (7), together with equations (6), can be combined with equations (3) and (5) to generate the sum functions $$\overline{S1} = H1 \cdot LG + H1 \cdot LP \cdot C + \overline{H1} \cdot \overline{LG} \cdot \overline{LP} + \overline{H1} \cdot \overline{LG} \cdot \overline{C} \quad (8a)$$

$$\overline{S2} = X2 \cdot G1 + X2 \cdot P1 \cdot LG + X2 \cdot P1 \cdot LP \cdot C + Y2 \cdot \overline{P1} + Y2 \cdot \overline{G} \cdot \overline{1} \cdot \overline{LG} \cdot \overline{LP} + Y2 \cdot \overline{G1} \cdot \overline{LG} \cdot \overline{C} \quad (8b)$$

$$\overline{S4} = X4 \cdot G1 + X4 \cdot P1 \cdot LG + X4 \cdot P1 \cdot LP \cdot C + Y4 \cdot \overline{P1} + Y4 \cdot \overline{G} \cdot \overline{1} \cdot \overline{LG} \cdot \overline{LP} + Y4 \cdot \overline{G1} \cdot \overline{LG} \cdot \overline{C} \quad (8c)$$

$$\overline{S8} = X8 \cdot G1 + X8 \cdot P1 \cdot LG + X8 \cdot P1 \cdot LP \cdot C + Y8 \cdot \overline{P1} + Y8 \cdot \overline{G} \cdot \overline{1} \cdot \overline{LG} \cdot \overline{LP} + Y8 \cdot \overline{G1} \cdot \overline{LG} \cdot \overline{C} \quad (8d)$$

Where:
$Pi = Ai + Bi$
$Gi = Ai \cdot Bi$ for $i = 1,2,4,8$ (the 4 bits of a digit)
$Hi = Ai \not\equiv Bi$
$Si =$ Sum
$LG =$ Local Generate
$LP =$ Local Propagate
$C =$ Carry input into group so that $LG + LP \cdot C =$ Input Carry to Digit and $\overline{LG} \cdot \overline{LP} + \overline{LG} \cdot \overline{C} =$ Complement of Input Carry to Digit
$(X2, X4, X8) =$ coefficients of positive input carry into high-order 3 bits of digit
$(Y2, Y4, Y8) =$ coefficients of negative input carry into high-order 3 bits of digit The seeming complexity of equations (8a) through (8d) results, to a large extent, from the generalized approach which utilizes the local generate and local propagate functions LG and LP. If this generality were to be eliminated by stipulating that each digit is the group that is used for carry look-ahead, then equations (8a) through (8d) could be simplified by using the relationships $$C1 = G1 + P1 \cdot C$$

$$\overline{C1} = \overline{P1} + \overline{G1} \cdot \overline{C}$$

Then the equations for the sum bits Si would become $$\overline{S1} = H1 \cdot C + \overline{H1} \cdot \overline{C} \quad (9a)$$

$$\overline{S2} = X2 \cdot G1 + X2 \cdot P1 \cdot C + Y2 \cdot \overline{P1} + Y2 \cdot \overline{G1} \cdot \overline{C} \quad (9b)$$

$$\overline{S4} = X4 \cdot G1 + X4 \cdot P1 \cdot C + Y4 \cdot \overline{P1} + Y4 \cdot \overline{G1} \cdot \overline{C} \quad (9c)$$

$$\overline{S8} = X8 \cdot G1 + X8 \cdot P1 \cdot C + Y8 \cdot \overline{P1} + Y8 \cdot \overline{G1} \cdot \overline{C} \quad (9d)$$

Figure 5A:
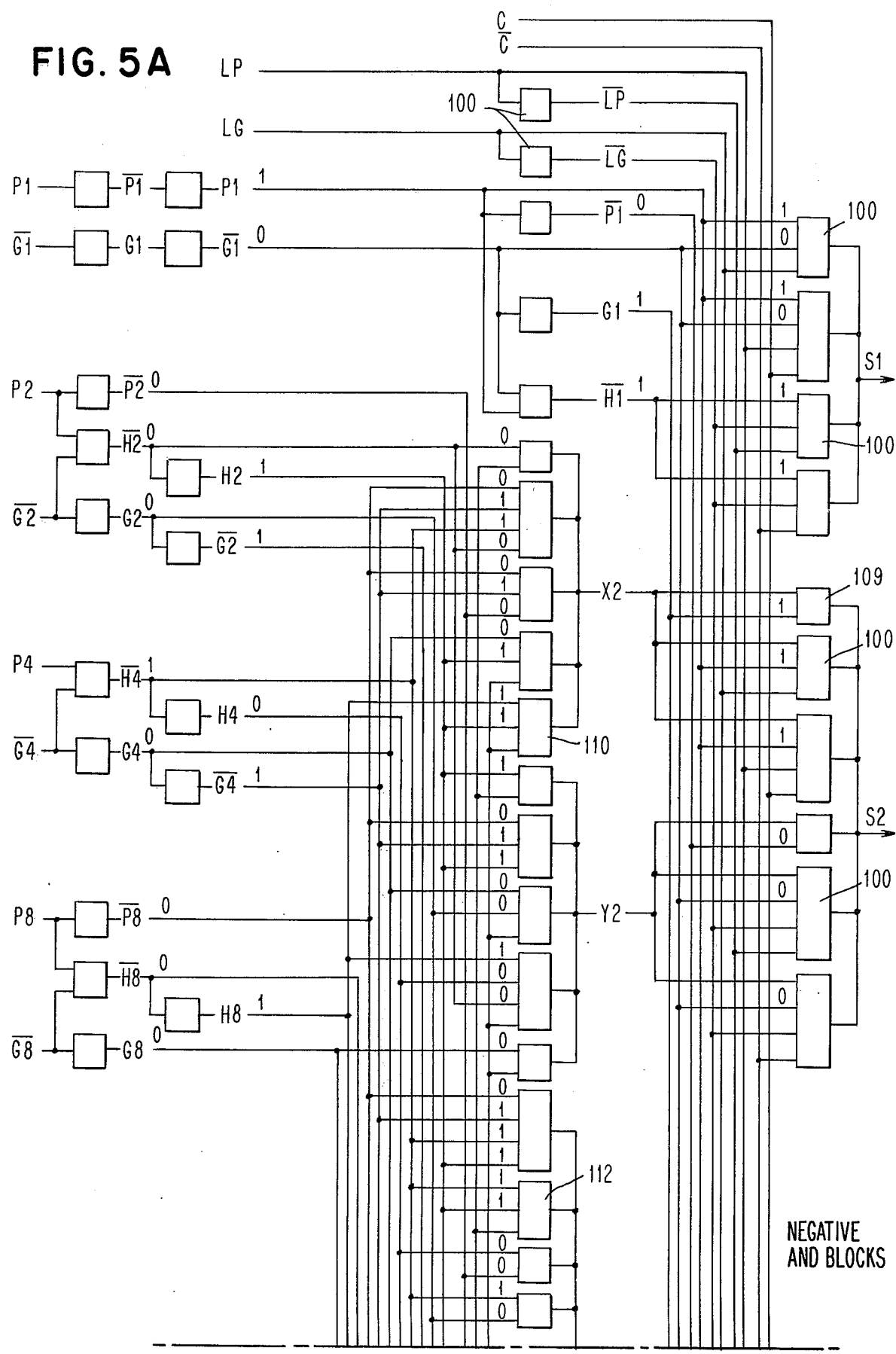
FIGS. 5A and 5B show the logic used in a preferred implementation of one digit stage of the invention.
Figure 5B:
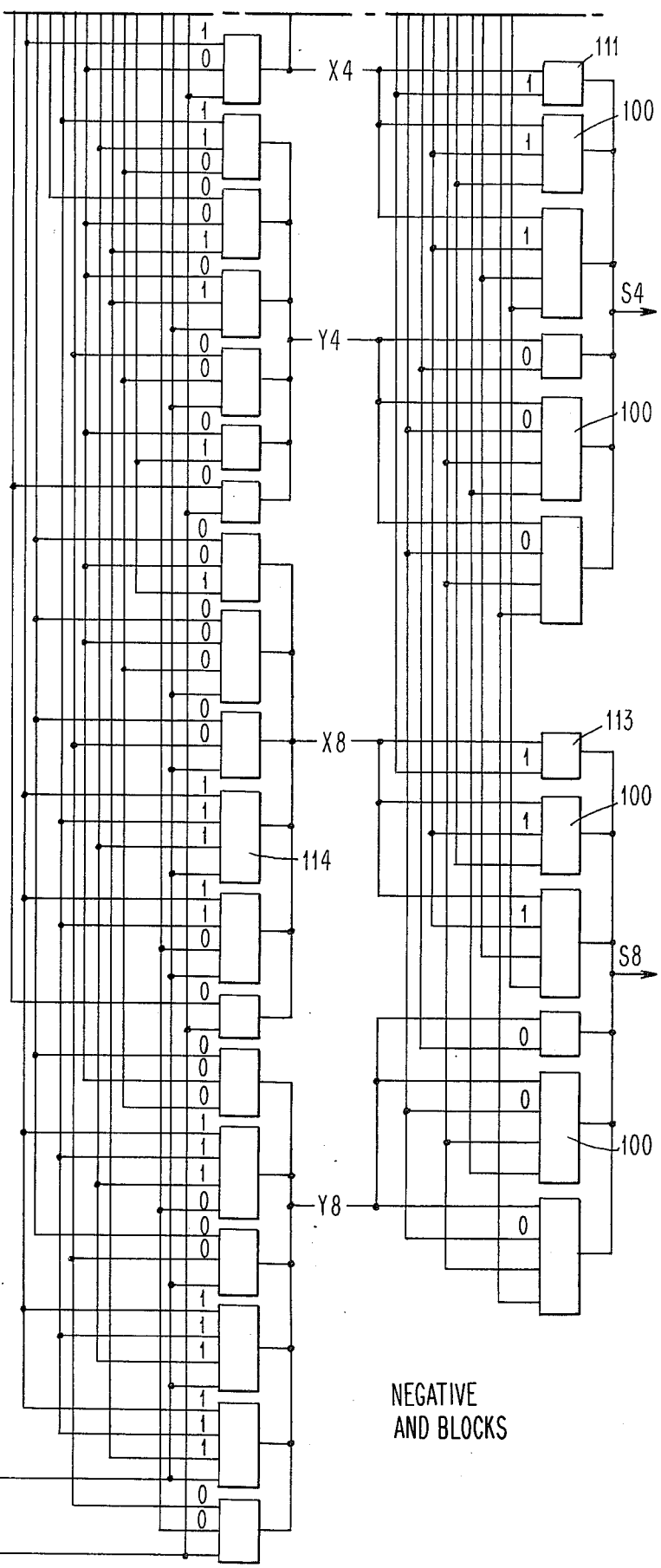

FIG. 5 shows a straightforward implementation, using negative logic, of a hexadecimal and binary sum generator in accordance with equations (6) and (8), with two minor exceptions: the term $\overline{P4}$ has been replaced by $\overline{G4} \cdot \overline{H4}$; and the term H1 has been replaced by the terms $P1 \cdot \overline{G1}$.

If the less general case, as exemplified by the sum equations (9a) through (9d) were to be utilized, the input lines labeled LP and LG could be eliminated, along with the ten circuits 100, all of which would be redundant in the simplified implementation. As was the case with FIG. 2 and 3, FIG. 5 does not explicitly show circuitry for generating the bit carry propagate and bit carry generate functions from the bit inputs. Such circuitry is so well known that no explicit showing of it is required here.

Numerical Example

Consider an example in which it is desired to add the numbers 9 (binary representation 1001) and 3 (binary representation 0011). A solution of equation (1a) provides the four bit carry propagate functions: $P1 = 1$, $P2 = 1$, $P4 = 0$ and $P8 = 1$. Equation (1b) provides the four bit carry generate functions $G1 = 1$, $G2 = 0$, $G4 = 0$ and $G8 = 0$. Equation (1c) provides the four half-sums $H1 = 0$, $H2 = 1$, $H4 = 0$ and $H8 = 1$. These bit functions are computed without regard to the number base in which arithmetic will be performed.

The above bit functions can be used in equations (2) to find the group carry propagate (GP) and group carry generate (GC) functions. For decimal arithmetic: $GP = 1$ because the equation (2a) relationship $$GP\ (dec) = DEC \cdot P8 \cdot P1$$

is satisfied and none of the relationships of equation (2b) is satisfied; and $GC = 1$ because the equation (2c) relationships $$GC\ (dec) = DEC \cdot P8 \cdot P2 + DEC \cdot P8 \cdot G1$$

are satisfied (note that two relationships are satisfied; either one would have been sufficient) and none of the relationships in equation (2d) is satisfied. For hexadecimal arithmetic: $GP = 0$ because the relationship $$\overline{GP}\ (hex) = \overline{P4 \cdot DEC}$$

of equation (2b) is satisfied and none of the equation (2a) relationships is satisfied; and $GC = 0$ because the relationship $$\overline{GC}\ (hex) = \overline{G8 \cdot P4 \cdot DEC}$$

of equation (2d) is satisfied and none of the equation (2c) relationships is satisfied.

The above bit and group functions can be used in equations (6) to find $Xi$ and $Yi$ for both decimal and hexadecimal. For decimal: equaltion (6b) is satisfied because $$\overline{X2}\ (dec) = H8 \cdot H2 \cdot DEC$$

so $X2 = 0$; none of the relationships in equations (6a), (6c), (6d), (6e) and (6f) are satisfied so $$Y2 = X4 = Y4 = X8 = Y8 = 1.$$

For hexadecimal: none of the relationships in equations (6b) or (6c) are satisfied so $$X2 = Y4 = 1;$$

$$Y2 = X4 = Y8 = X8 = 0$$

because the following relationships of equations (6a), (6d), (6e) and (6f), respectively, are satisfied:

$$\overline{Y1}\ (hex) = H2 \cdot DEC$$

$$\overline{X4}\ (hex) = \overline{H4 \cdot H2 \cdot DEC}$$

$$\overline{Y8}\ (hex) = H8 \cdot \overline{P4 \cdot DEC} + H8 \cdot \overline{G4 \cdot G2 \cdot DEC}$$

$$\overline{X8}\ (hex) = H8 \cdot \overline{P4 \cdot DEC}$$

(In this particular example, the hexadecimal case satisfies two of the relationships of equation (6e). Either one of them would have been sufficient to determine $Y8 = 0$.)

The above results can then be utilized in equations (8) to determine the sum bits for both decimal and hexadecimal. Assuming that there has been no carry into this digit, for decimal: $S1 = 0$ because at least one of the terms $$\overline{S1}\ (dec) = \overline{H1 \cdot LG \cdot LP} + \overline{H1 \cdot LG \cdot C}$$

from equation (8a) must have been satisfied; $S2 = 1$ because none of the terms in equation (8b) is satisfied; $S4 = 0$ because the term $$\overline{S4}\ (dec) = X4 \cdot G1$$

of equation (8c) is satisfied; and $S8 = 0$ because the term $$\overline{S8}\ (dec) = X8 \cdot G1$$

of equation (8d) is satisfied. For the hexadecimal case, again assuming no carry into the digit: $S1 = 0$ for exactly the same reasons that $S1 = 0$ in the decimal case; $S2 = 0$ because the condition $$\overline{S2}\ (hex) = X2 \cdot G1$$

of equation (8b) is satisfied; and $S4 = S8 = 1$ because none of the conditions in equations (8c) and (8d) are satisfied.

Thus, when adding (1001) plus (0011): the decimal result is (0010) plus a carry; the hexadecimal result is (1100) with neither a carry generate nor a carry propagate. The above results are summarized in the following TABLE.

TABLE

|  | (1001) + (0011) | |
|---|---|---|
|  | DEC | HEX (=$\overline{DEC}$) |
| GP | 1 | 0 |
| GC | 1 | 0 |
| X2 | 0 | 1 |
| Y2 | 1 | 0 |
| X4 | 1 | 0 |
| Y4 | 1 | 1 |
| X8 | 1 | 0 |
| Y8 | 1 | 0 |
| S1 | 0 | 0 |
| S2 | 1 | 0 |
| S4 | 0 | 1 |
| S8 | 0 | 1 |

In the above example, reference was made to the equations contained herein in order to describe the operation of this invention. The same example is briefly summarized below, with respect to the actual preferred circuit implementations of the invention.

The group carry propagate functions (GP) and their complements can be generated by the circuitry shown in FIGS. 2B and 2A, respectively. In both of these figures, the values for the bit carry propagate (Pa) and bit carry generate (Gi) functions have been shown for the example (1001) plus (0011). In FIG. 2A, the only negative AND (NAND) block which does not already contain at least one zero input is NAND 101. When operating in hexadecimal mode, the third input to NAND 101 will be $DEC = 0$ and none of the NAND blocks in FIG. 2A will have their input conditions satisfied. In this negative logic implementation, the lack of satisfaction of all of the input conditions for each of the NAND blocks will result in transmission of a positive signal, representing $GP = 0$ from the SEND circuit of FIG. 2A. Referring to FIG. 2B, in the hexadecimal case the input conditions of blocks 102 and 103 are satisfied, resulting in a zero signal from the SEND block in FIG. 2B. When decimal arithmetic is being utilized, all of the input conditions of NAND 101 in FIG. 2A will be satisfied, resulting in transmission of a zero signal from the SEND block. In the decimal case, the input condition of block 103 in FIG. 2B will not be satisfied, nor will the input conditions of any of the other blocks which feed the lower input to the SEND circuit. For this case, the SEND circuit of FIG. 2B will send a one signal, indicating that $GP = 1$ for the decimal case.

Generation of the complement and true digit carry generate signals are shown in FIGS. 3A and 3B, respectively. In FIG. 3A, the input conditions of blocks 104 and 105, which are dot-ORed to one input of the SEND circuit, are always satisfied. For decimal arithmetic, the input condition of block 106, which feeds the other input of the SEND circuit, will also be satisfied, resulting in a zero signal from the SEND circuit. For the hexadecimal case, none of the blocks which feeds the upper input of the SEND circuit will have its input conditions satisfied, resulting in transmission of a one signal, representing $GC = 0$. Referring now to FIG. 3B, it will be seen that the input conditions of block 107 are always satisfied. This block feeds the upper input of the SEND circuit. Of the blocks which feed the lower input of the SEND circuit, only block 108 can be satisfied, and the input condition of block 108 will only be satisfied when operating in hexadecimal. Therefore, in hexadecimal, there will be a zero output from the SEND circuit of FIG. 3B. However, in decimal mode, none of the blocks which feed the lower input of the SEND circuit will be satisfied, and this will result in the transmission of a one signal from the SEND circuit, indicating that $GC = 1$.

Thus, the hardware shown in FIGS. 2 and 3 accomplishes the same result that was described above with respect to equations (2) by producing signals $GP = GC = 1$ for decimal mode, and $GP = GC = 0$ for hexadecimal mode.

In FIG. 5, which illustrates one stage of the sum generation circuitry used in this invention, the values for the input bit functions, in accordance with this example, are indicated.

Of the four blocks which have their outputs dot-ORed to generate $S1$, two already have a zero input provided by one bit function and two do not have a zero input. In situations where there is no carry into this digit, at least one of the latter two blocks will have all of its input conditions satisfied, resulting (because of the negative logic used in this implementation) in $S1 = 0$. If there is a carry into this digit position, then each of the latter two blocks will receive at least one zero input, resulting in $S1 = 1$.

Referring now to the six circuit blocks whose outputs are dot-ORed to produce $S2$, it will be seen that each of the three blocks that is fed by $Y2$ already has a zero input. Thus, $S2$ will not be affected by $Y2$. However two-input block 109 has a one input (from $G1$) and an $X2$ input. Therefore, if $X2 = 1$, the inputs to block 109 will both be satisfied, resulting in $S2 = 0$. If $X2 = 0$, block 109 will have a zero input (as will the other two blocks fed by $X2$), resulting in $S2 = 1$. Referring to the five blocks whose outputs are dot-ORed to generate $X2$, it will be seen that only block 110 does not already have a zero input. Block 110 will have all of its input conditions satisfied (resulting in $X2 = 0$ and $S2 = 1$) when $DEC = 1$, indicating decimal arithmetic. In the hexadecimal case, $DEC = 0$, resulting in $X2 = 1$ and $S2 = 0$.

Similarly, inspection of the six blocks whose outputs are dot-ORed to produce $S4$, shows that, for this example, $S4$ is independent of $Y4$ (because each of the blocks fed by $Y4$ already has a zero input) and is completely dependent upon $X4$ (because two-input block 111 has a one input (from $G1$) and an $X4$ input.) Of the five blocks whose outputs are dot-ORed to produce $X4$, only block 112 does not already have at least one zero input. All of the input conditions of block 112 will be satisfied when $\overline{DEC} = 1$, indicating hexadecimal arithmetic. $\overline{DEC} = 1$ will result in $X4 = 0$, which in turn will result in $S4 = 1$. When $\overline{DEC} = 0$ (indicating decimal arithmetic) $X4 = 1$, causing $S4 = 0$. (Although, in this particular example, it does not affect any of the sum digits, note that $Y4 = 1$ in both decimal and hexadecimal mode, because each of the blocks which has an output dot-ORed to $Y4$ already contains at least one zero input.)

In like manner, $S8$ is entirely dependent upon $X8$ (through block 113) which in turn is entirely dependent upon the mode of arithmetic (decimal or hexadecimal) through block 114. In hexadecimal mode, $\overline{DEC} = 1$, resulting in $X8 = 0$ and $S8 = 1$. In decimal mode, $\overline{DEC} = 0$, resulting in $X8 = 1$ and $S8 = 0$.

Thus, the sum generation circuitry shown in FIG. 5 produces exactly the same values of $Xi$, $Yi$ and $Si$ that were shown to be produced by equations (6) and (8) as discussed above.

Although the above description of a preferred embodiment of this invention has not specifically described various related items (such as, for example, timing circuitry) that are necessary in order to practice this invention, details of such items are well known to those skilled in the art and need not be repeated here.

Also, it is noted that the above discussion has referred to addition, and has not mentioned other arithmetic operations such as subtraction, multiplication and division. As is well known to those skilled in the art, subtraction may be readily performed by complement adding a subtrahend to a minuend, multiplication may be performed by repetitive addition, and division may be performed by repetitive complement-additions. Again, the circuitry for setting up and controlling these operations is well known to those skilled in the art and need not be described herein.

Of course, those skilled in the art will recognize that the logical implementations of various functions could utilize either negative logic or positive logic, and the signals generated could be either the "true" functions or their inverses. These equivalents are well known.

While the invention has been described with resepct to a preferred embodiment thereof, those skilled in the art will recognize that various changes in form and details may be made therein without departing from the spirit and scope of the invention.

What is claimed is:

1. A logic system for performing addition of two numbers, in one of a plurality of number bases, each number consisting of binary-coded representation of at least one digit, comprising:
- signalling means for indicating the number base being utilized;
- first logic means for signalling a carry C into said one digit; and
- second logic means responsive to said signalling means and to said first logic means for implementing sum bits $Si$ by logically solving the equation $\overline{Si} = Xi\, C + Yi\, \overline{C}$ or its logical equivalent, where $Xi$ and $Yi$ are predetermined logical combinations of the output of said signalling means and of $Ai$ and $Bi$, where $Ai$ and $Bi$ are respective bits of arithmetic weight $i$ of said digits.

2. The logic system of claim 1 wherein the digits can be expressed either in binary-coded-decimal or in hexadecimal format, and wherein:
- the output of said signalling means is either a signal DEC indicating decimal arithmetic or a signal $\overline{DEC}$ indicating hexadecimal arithmetic; and
- said second logic means includes means for logically solving the following equations or their logical equivalents:

$\overline{Y1} = H1$ $\overline{X1} = \overline{H1}$ $\overline{Y2} = H2 \cdot \overline{DEC} + \overline{P8} \cdot \overline{G4} \cdot H2 + G4 \cdot G2 \cdot DEC + H8 \cdot H4 \cdot \overline{H2} \cdot DEC + G8 \cdot DEC$ $\overline{X2} = \overline{H2} \cdot \overline{DEC} + \overline{P8} \cdot \overline{P4} \cdot \overline{H2} + \overline{P8} \cdot \overline{G4} \cdot \overline{P2} + G4 \cdot H2 \cdot DEC + H8 \cdot H2 \cdot DEC$ $\overline{Y4} = \overline{P4} \cdot G2 + \overline{P8} \cdot H4 \cdot \overline{G2} + H4 \cdot \overline{G2} \cdot \overline{DEC} + G4 \cdot G2 \cdot \overline{DEC} + H4 \cdot H2 + G8 \cdot DEC$ $\overline{X4} = \overline{P8} \cdot \overline{P4} \cdot H2 + \overline{H4} \cdot H2 \cdot \overline{DEC} + H4 \cdot \overline{P2} + \overline{H4} \cdot G2 + H8 \cdot H4 \cdot DEC$ $\overline{Y8} = \overline{H8} \cdot H4 \cdot G2 + H8 \cdot \overline{P4} \cdot \overline{P2} + \overline{H8} \cdot G4 \cdot \overline{DEC} + H8 \cdot \overline{P4} \cdot \overline{DEC} + H8 \cdot \overline{G4} \cdot \overline{G2} \cdot \overline{DEC} + G4 \cdot \overline{P2} \cdot DEC$ $\overline{X8} = \overline{H8} \cdot H4 \cdot H2 + \overline{H8} \cdot H4 \cdot G2 \cdot \overline{DEC} + \overline{H8} \cdot G4 \cdot \overline{DEC} + H8 \cdot \overline{P4} \cdot \overline{DEC} + H8 \cdot \overline{G4} \cdot \overline{P2} \cdot \overline{DEC} + G8 \cdot DEC$ where
$Pi = Ai + Bi$
$Gi = Ai \cdot Bi$
$Hi = Ai \veebar Bi.$ 3. A method for performing addition of two numbers, in one of a plurality of number bases, in a logic system including a plurality of logic circuits, each number consisting of a binary-coded representation of at least one digit, said method comprising:
- producing a first electrical signal indicating the number base being utilized;
- logically producing a carry signal C into said one digit;
- logically producing sum bits $Si$ by logically solving the equation $\overline{Si} = Xi \cdot C + Yi \cdot \overline{C}$ or its logical equivalent, where $Xi$ and $Yi$ are predetermined logical combinations of said first electrical signal and $Ai$ and $Bi$, where $Ai$ and $Bi$ are respective bits of arithmetic weight $i$ of said digits.

4. The method of claim 3 wherein the digits are expressed either in binary-coded-decimal or in hexadecimal format, a a signal DEC indicates decimal arithmetic, a signal $\overline{DEC}$ indicates hexadecimal arithmetic, and wherein $Xi$ and $Yi$ ($i = 1, 2, 4, 8$) are produced by logically solving the following equations or their logical equivalents:

$\overline{Y1} = H1$ $\overline{X1} = \overline{H1}$ $\overline{Y2} = H2 \cdot \overline{DEC} + \overline{P8} \cdot \overline{G4} \cdot H2 + G4 \cdot G2 \cdot DEC + H8 \cdot H4 \cdot \overline{H2} \cdot DEC + G8 \cdot DEC$ $\overline{X2} = \overline{H2} \cdot \overline{DEC} + \overline{P8} \cdot \overline{P4} \cdot \overline{H1} + \overline{P8} \cdot \overline{G4} \cdot \overline{P2} + G4 \cdot H2 \cdot DEC + H8 \cdot H2 \cdot DEC$ $\overline{Y4} = \overline{P4} \cdot G2 + \overline{P8} \cdot H4 \cdot \overline{G2} + H4 \cdot \overline{G2} \cdot \overline{DEC} + G4 \cdot G2 \cdot \overline{DEC} + H4 \cdot H2 + G8 \cdot DEC$ $\overline{X4} = \overline{P8} \cdot \overline{P4} \cdot H2 + \overline{H4} \cdot H2 \cdot \overline{DEC} + H4 \cdot \overline{P2} + \overline{H4} \cdot G2 + H8 \cdot H4 \cdot DEC$ $\overline{Y8} = \overline{H8} \cdot H4 \cdot G2 + H8 \cdot \overline{P4} \cdot \overline{P2} + \overline{H8} \cdot G4 \cdot \overline{DEC} + H8 \cdot \overline{P4} \cdot \overline{DEC} + H8 \cdot \overline{G4} \cdot \overline{G2} \cdot \overline{DEC} + G4 \cdot \overline{P2} \cdot DEC$ $\overline{X8} = \overline{H8} \cdot H4 \cdot H2 + \overline{H8} \cdot H4 \cdot G2 \cdot \overline{DEC} + \overline{H8} \cdot G4 \cdot \overline{DEC} + H8 \cdot \overline{P4} \cdot \overline{DEC} + H8 \cdot \overline{G4} \cdot \overline{P2} \cdot \overline{DEC} + G8 \cdot DEC$ where
$Pi = Ai + Bi$
$Gi = Ai \cdot Bi$
$Hi = Ai \veebar Bi.$

* * * * *

UNITED STATES PATENT AND TRADEMARK OFFICE
CERTIFICATE OF CORRECTION

PATENT NO. : 4,118,786
DATED : October 3, 1978
INVENTOR(S) : Levine et al.

It is certified that error appears in the above-identified patent and that said Letters Patent are hereby corrected as shown below:

Column 14, line 18, the word "a" second occurrence should be deleted.

Column 14, line 27, the equation should read $$\overline{X2} = \overline{H2} \cdot \overline{DEC} + \overline{P8} \cdot \overline{P4} \cdot \overline{H2} + \overline{P8} \cdot \overline{G4} \cdot \overline{P2} +$$

Signed and Sealed this

Sixteenth Day of January 1979

[SEAL]

Attest:

RUTH C. MASON
*Attesting Officer*

DONALD W. BANNER
*Commissioner of Patents and Trademarks*